Figure 1:
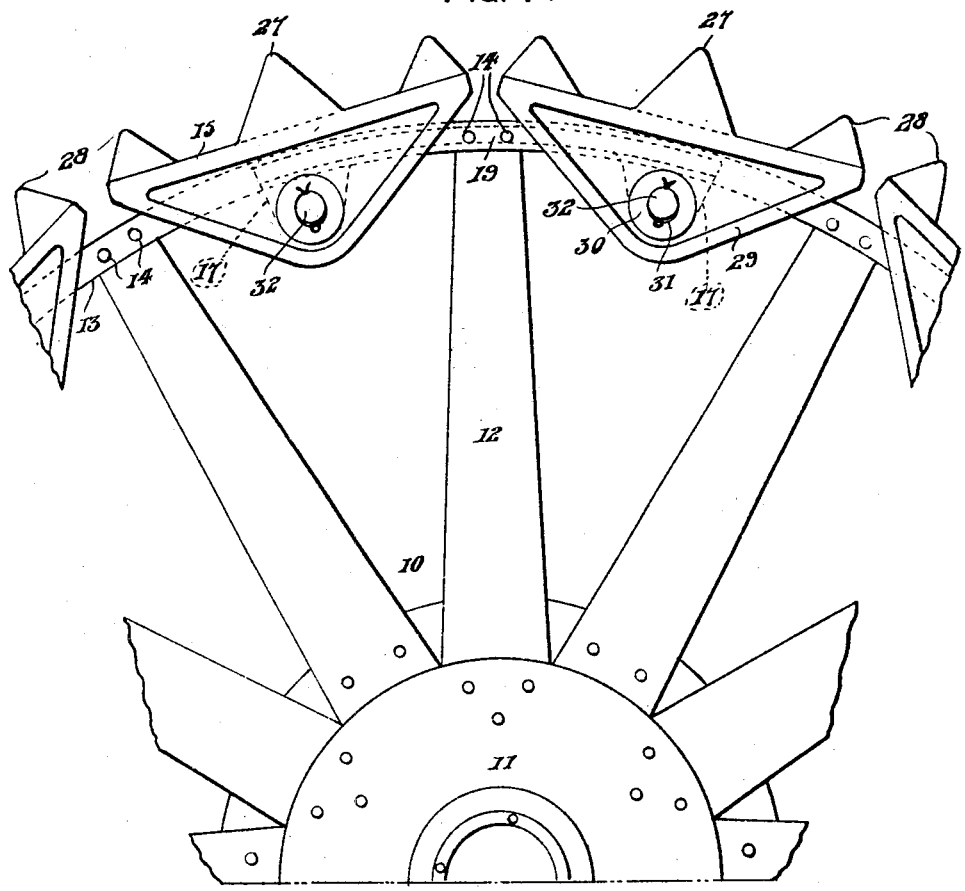

O. E. ZAHN.
TRACTOR WHEEL AND LUG.
APPLICATION FILED NOV. 30, 1920.

1,381,389.

Patented June 14, 1921.

2 SHEETS—SHEET 1.

Inventor
O. E. Zahn

By F. W. Bryant
Attorney

O. E. ZAHN.
TRACTOR WHEEL AND LUG.
APPLICATION FILED NOV. 30, 1920.
1,381,389.
Patented June 14, 1921.
2 SHEETS—SHEET 2.
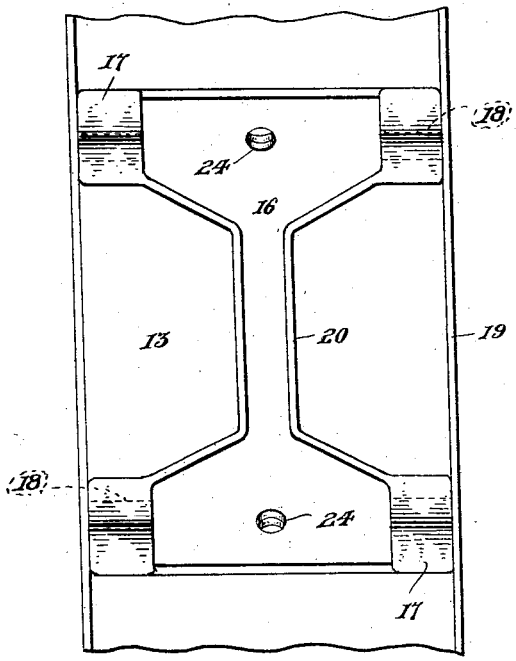
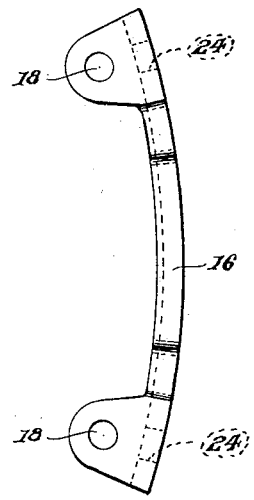
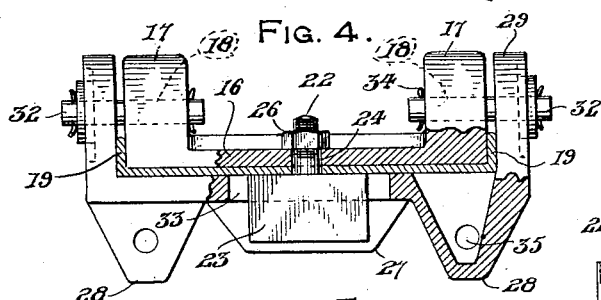
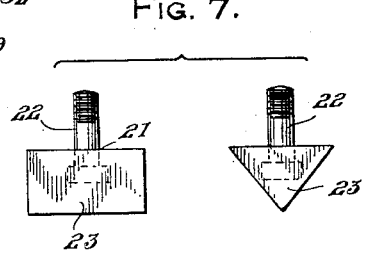
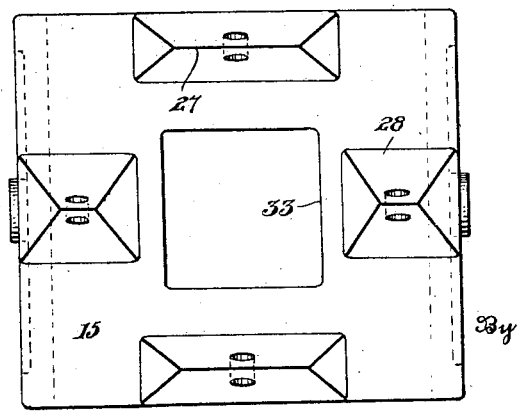
Inventor
O. E. Zahn
By J. A. Bryant
Attorney

UNITED STATES PATENT OFFICE.

OTTO E. ZAHN, OF SCHLEISINGERVILLE, WISCONSIN, ASSIGNOR TO JULIUS E. KIEFER, OF MILWAUKEE, WISCONSIN.

TRACTOR-WHEEL AND LUG.

1,381,389.  Specification of Letters Patent.  Patented June 14, 1921.

Application filed November 30, 1920. Serial No. 427,398.

*To all whom it may concern:*

Be it known that I, OTTO E. ZAHN, a citizen of the United States of America, residing at Schleisingerville, in the county of Washington and State of Wisconsin, have invented certain new and useful Improvements in Tractor-Wheels and Lugs, of which the following is a specification.

The primary object of the invention is the provision of a vehicle wheel especially adapted for tractors and having a form of tread preventing the wheel from sinking into the ground during travel as well as affording flat traction surfaces for the wheel.

A further object of the invention is the provision of a tread plate adapted for attachment to a wheel rim for affording increased traction properties, the construction possessing great strength and being easy and inexpensive to manufacture.

A still further object of the invention is the provision of a non-skid traction lug readily removable in pivotal relations upon a channel rim providing a tread for the wheel adapted for flatly engaging the surface being traveled over, the parts of the device being readily renewable.

With these general objects in view, the invention consists of the novel combination and arrangement of parts hereinafter more fully described in connection with the accompanying drawings and in which like reference characters designate corresponding parts throughout the several views.

Figure 2:
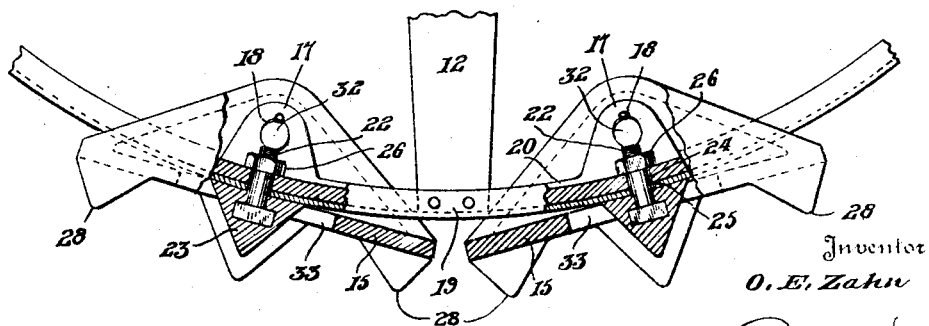

In the drawings,

Figure 1 is an elevational view of the upper portion of a wheel provided with my invention, Fig. 2 is a similar view of a lower portion of the wheel with parts broken away upon the plane of the center of the rim, Fig. 3 is an interior elevational view of a portion of the rim with the mounting saddle positioned therein, Fig. 4 is a transverse radial sectional view through the rim with portions of the device broken away, Fig. 5 is a plan view of the outer face of one of the traction lugs, Fig. 6 is a side elevation of the saddle shown in Fig. 3 and Fig. 7 shows the calk bolt in side and end elevation, which is employed for securing the saddle to the rim.

My tread plate or lug is herein illustrated in connection with a tractor wheel 10 having a hub 11, radial spokes 12 and a channel-shaped rim 13 secured to the outer ends of the spokes in any usual manner as by rivets 14, such lugs or tread plates being designated 15, pivotally mounted upon the rim 13 in the manner herein set forth.

A substantially H-shaped saddle 16 is employed for attaching the lugs 15 to the rim 13 in pairs with each pair of lugs suitably spaced apart uniformly around the rim or in any other arrangement desired. The saddle 16 has a bearing lug 17 at each of its four corners provided with a journal opening 18 positioned inwardly of the opposite flanges 19 of the rim when the saddle 16 is positioned within the rim 13 as best illustrated in Figs. 3 and 4 of the drawings. Substantially U-shaped strengthening ribs 20 are provided upon the inner margins of the saddle 16 between the lugs 17, these ribs being of substantially the same height as the flanges 19. The central portion of the saddle 16 is positioned within the rim 13 at the point where the spoke 12 is secured to the rim and the adjacent end of the spoke may be suitably slotted or otherwise arranged for accommodating the ribs 20 when the device is assembled although it is deemed unnecessary to describe such connection in detail as it forms no part of the invention.

A calk bolt 21 consisting of a bolt 22 having a tent-shaped calk 23 forming a head for the bolt is provided for each of the perforations 24 in the saddle 16 for securing the saddle to the rim. The bolt portions 22 extend through perforations 25 in the rim and through the perforations 24 of the saddle with the calks 23 transversely positioned upon the outer face of the rim 13 and with nuts 26 threaded upon the inner ends of the bolts 22 inwardly of the saddle 16 as best shown in Figs. 2 and 4 of the drawings and whereby the saddle is securely maintained within the channel of the rim.

The lug 15 is in the form of a rectangular tread plate having sharpened calks 27 adjacent its longitudinal edges and positioned transversely of the rim 13 when the calk is mounted thereon while sharpened rectangular calks 28 are provided adjacent the opposite ends of the plate 15 positioned at the sides of the rim when the device is in use.

Marginal ears 29 substantially triangular in form are provided upon the inner side of the lug plate 15 opposite the calks 28 with central bosses 30 having perforations 31 through which journaling pins 32 are positioned for passing through the openings 18 of the adjacent saddle 16 when the lug 15 is in its operative position straddling the rim 13. A rectangular opening 33 centrally of the lug plate 15 accommodates the calk 23 of the calk bolt 21 permitting the lug 15 to shift pivotally upon the pins 32 without engaging said head 23.

The lugs 15 being mounted for pivotal movement upon the outer face of the rim 13 in the manner described, the perforations 31 of the bosses 30 are preferably oval-shaped for loosely journaling the lugs upon the pins 32, thereby permitting the lugs more freedom of movement. The operation of the device will be apparent from this detailed description of the lug 15 and its operative assembling upon the wheel rim 13, the said lug 15 assuming a substantially flat position upon the roadbed during the travel of the wheel 10 thereover as well as projecting the lugs 27 and 28 into the roadbed for affording greater traction properties. In this manner, the traction plates 15 provide a form of tread for the wheel 10 during the travel thereof, the construction possessing great strength and the plates 15 being readily removable by removing the journaling pins 32. Cotter pins 34 are provided through the pins 32 adjacent the opposite ends thereof for normally retaining the pins 32 in their journaling positions. The calk head 23 provides a rigid ground engaging member upon the rim 13 centrally of the pivoted plate 15 which is pivotally movable with its calks 27 and 28 and all of which arrangement provides strong gripping engagement with the roadbed. The calks 27 and 28 are preferably hollow with perforations 35 extending therethrough. The form of the invention herein set forth being the preferred embodiment thereof, it will nevertheless be understood that minor changes may be made therein without departing from the spirit and scope of my invention.

What is claimed as new is:

1. A traction member comprising a saddle having journal projections adjacent the corners thereof, tread plates for each pair of projections and journaling connections between each plate and the adjacent projections of the saddle.

2. A tread member comprising a substantially H-shaped mounting saddle, a pair of journals projecting from each end of the saddle, a tread plate for each pair of journals, perforated ears at the opposite ends of the plates and pins through the adjacent journals and ears whereby two tread plates are pivoted to the saddle when the device is assembled.

3. A tread member comprising a substantially H-shaped mounting saddle, a pair of journals projecting from each end of the saddle, a tread plate for each pair of journals, perforated ears at the opposite ends of the plates, pins through the adjacent journals and ears whereby two tread plates are pivoted to the saddle when the device is assembled, outwardly projecting calks upon said tread plates, the said plates having central openings and the saddles having perforations substantially centrally of said openings when the device is assembled and attaching bolts for the saddle adapted for positioning with the heads of the bolts in said openings and the bolts projecting through said perforations when the device is in use.

4. A device of the class described comprising a channel-shaped rim, an H-shaped saddle mounted within the rim having inwardly projecting journals, tread plates upon the periphery of the rim, inwardly projecting ears upon the tread plates, and journal pins pivotally extending through said ears and the journals of the saddle.

5. A device of the class described comprising a channel-shaped rim, an H-shaped saddle positioned in the channel of the rim, a tread plate spanning the exterior of the rim having a central opening, pivotal connections between said saddle and tread plate and a securing bolt through the rim and saddle with the head of the bolt upon the outer face of the rim substantially centrally of the opening in the tread plate.

6. A device of the class described comprising a channel-shaped rim, an H-shaped saddle positioned in the channel of the rim, a tread plate spanning the exterior of the rim having a central opening, pivotal connections between said saddle and tread plate, a securing bolt through the rim and saddle with the head of the bolt upon the outer face of the rim substantially centrally of the opening in the tread plate whereby the head of the bolt is adapted for engaging the roadbed during the traveling of the wheel and outwardly projecting calks upon the plate adjacent the said opening.

In testimony whereof I affix my signature.

OTTO E. ZAHN.